(12) United States Patent
Kim et al.

(10) Patent No.: US 7,581,868 B2
(45) Date of Patent: Sep. 1, 2009

(54) BACKLIGHT ASSEMBLY AND LIQUID CRYSTAL DISPLAY APPARATUS HAVING THE SAME

(75) Inventors: Dong-Hoon Kim, Seoul (KR); Jheen-Hyeok Park, Seongnam-si (KR); Jin-Sung Choi, Yongin-si (KR); Jong-Dae Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 382 days.

(21) Appl. No.: 11/152,009

(22) Filed: Jun. 14, 2005

(65) Prior Publication Data
US 2005/0281054 A1 Dec. 22, 2005

(30) Foreign Application Priority Data
Jun. 16, 2004 (KR) .............. 10-2004-0044269
Dec. 13, 2004 (KR) .............. 10-2004-0104988

(51) Int. Cl.
*F21V 7/04* (2006.01)
(52) U.S. Cl. ............. 362/626; 362/607; 362/628
(58) Field of Classification Search ......... 362/607, 362/608, 610, 614, 615, 621, 623, 625, 626, 362/628; 349/65
See application file for complete search history.

(56) References Cited

U.S. PATENT DOCUMENTS 5,575,549 A * 11/1996 Ishikawa et al. ......... 362/625
6,595,652 B2 * 7/2003 Oda et al. ............. 362/609
6,811,274 B2 * 11/2004 Olczak ................. 362/607
7,040,796 B2 * 5/2006 Sugiura et al. .......... 362/626
7,056,005 B2 * 6/2006 Lee ................. 362/625
2002/0114149 A1 8/2002 Yamashita et al.

FOREIGN PATENT DOCUMENTS

| | | |
|---|---|---|
| CN | 1401936 A | 3/2003 |
| EP | 1174659 A1 | 1/2002 |
| JP | 09292532 A * | 11/1997 |

OTHER PUBLICATIONS

Peoples Republic of China Office Action; Dec. 7, 2007; 200510076678.9. All references cited in the foreign Office action and not previously submitted are listed above.

* cited by examiner

*Primary Examiner*—Y My Quach Lee
(74) *Attorney, Agent, or Firm*—Cantor Colburn LLP

(57) ABSTRACT

In a backlight assembly and an LCD apparatus having the same, the backlight assembly includes a lamp that generates light and a light guiding plate. The light guiding plate includes a light incident surface, a light reflecting surface and a light exiting surface. The light generated from the lamp is incident into the light incident surface. The light reflecting surface is extended from a side of the light incident surface. The light reflecting surface has a prism pattern. The light exiting surface is extended from another side of the light incident surface. An angle formed between the light incident surface and the light exiting surface is smaller than about 90 degrees, and the light incident surface and the light reflecting surface face each other.

20 Claims, 10 Drawing Sheets

BACKLIGHT ASSEMBLY AND LIQUID CRYSTAL DISPLAY APPARATUS HAVING THE SAME

The present application claims priority from Korean Patent Application No. 2004-44269, filed on Jun. 16, 2004 and Korean Patent Application No. 2004-104988, filed on Dec. 13, 2004, the contents of which are incorporated by reference herein in their entireties.

BACKGROUND OF THE INVENTION

1. Field of the Invention

The present invention relates generally to a backlight assembly and a liquid crystal display (LCD) apparatus having the backlight assembly. More particularly, the present invention relates to a backlight assembly with improved light guiding plate and associated components, and an LCD apparatus having the backlight assembly with improvements on image display quality.

2. Description of the Related Art

An LCD apparatus displays images using liquid crystal. LCDs offer various advantages over alternative display apparatuses (e.g., cathode ray tubes) in that they are generally thinner and require low driving voltage, low power consumption, etc., making them ideal for use in a variety of applications.

A typical LCD apparatus includes an LCD panel and a backlight assembly. The LCD panel, in turn, may include a thin film transistor (TFT) substrate, a color filter substrate, and the liquid crystal. The color filter substrate corresponds to the TFT substrate. The liquid crystal is disposed between the TFT substrate and the color filter substrate. When an electrical field is applied to the liquid crystals, its molecular arrangement becomes varied, resulting in a change in light transmittance corresponding to the new arrangement. LCDs are considered to be non-emissive in that they emit no light of their own. Accordingly, a backlight is provided to the LCD, which supplies light to the LCD panel.

A typical backlight assembly includes a lamp and a light guiding plate. The lamp generates light, which is then guided into the LCD panel by the light guiding plate. The light guiding plate may include a prism pattern on its lower surface, which is presented at a slight pitch. The prism pattern enables the LCD apparatus to provide greater luminance. However, utilization of the prism pattern also causes deterioration in the display quality of the LCD. This is because the prism pattern causes the light to become concentrated at the sides of the light guiding plate, resulting in the formation of a bright line or a shadow at that location, thereby diminishing the display qualities of the LCD. What is needed, therefore, is an LCD apparatus and backlight assembly that eliminates or reduces the aforementioned deficiencies.

SUMMARY OF THE INVENTION

The present invention provides a backlight assembly for generating light of uniform luminance.

The present invention also provides a liquid crystal display (LCD) apparatus having the above-mentioned backlight assembly, which has improved image display quality.

A backlight assembly in accordance with an aspect of the present invention includes a lamp that generates light and a light guiding plate. The light guiding plate includes a light incident surface, a light reflecting surface and a light exiting surface. The light generated from the lamp is incident into the light incident surface. The light reflecting surface is extended from a side of the light incident surface. The light reflecting surface has a prism pattern. The light exiting surface is extended from another side of the light incident surface. An angle formed between the light incident surface and the light exiting surface is smaller than about 90 degrees, and the light exiting surface and the light reflecting surface face each other.

A backlight assembly in accordance with another aspect of the present invention includes a lamp that generates light and a light guiding plate. The light guiding plate includes a light incident surface, a light reflecting surface and a light exiting surface. The light generated from the lamp is incident into the light incident surface. The light reflecting surface is extended from a side of the light incident surface. The light reflecting surface includes a prism pattern having a plurality of prisms adjacent to one another. A height of each of the prisms between the light incident surface and a first point increases as a distance from the light incident surface to the first point increases. The first point is spaced a predetermined distance from the light incident surface. Each of the prisms has a recess on a ridge thereof between the light incident surface and the first point. The light exiting surface is extended from another side of the light incident surface. The light exiting surface and the light incident surface form an angle smaller than about 90 degrees. The light exiting surface and the light reflecting surface face each other.

A backlight assembly in accordance with still another aspect of the present invention includes a lamp that generates light and a light guiding plate. The light guiding plate includes a light incident surface, a light reflecting surface and a light exiting surface. The light generated from the lamp is incident into the light incident surface. The light reflecting surface is extended from a side of the light incident surface. The light reflecting surface includes a prism pattern, which includes a plurality of prisms adjacent to one another. A height of each of the prisms between the light incident surface and a selected position increases as a distance from the light incident surface to the selected position increases. The light exiting surface is extended from another side of the light incident surface. The light exiting surface and the light reflecting surface face each other.

A backlight assembly in accordance with still another aspect of the present invention includes a lamp that generates light and a light guiding plate. The light guiding plate includes a light incident surface, a light reflecting surface and a light exiting surface. The light generated from the lamp is incident into the light incident surface. The light reflecting surface is extended from a side of the light incident surface. The light reflecting surface includes a prism pattern having a plurality of prisms adjacent to one another. Each of the prisms has a recess on a ridge of a corresponding prism adjacent to the light incident surface. A light exiting surface is extended from another side of the light incident surface. The light exiting surface and the light reflecting surface face each other.

An LCD apparatus in accordance with an aspect of the present invention includes a backlight assembly and an LCD panel. The backlight assembly includes a lamp that generates light and a light guiding plate. The light guiding plate includes a light incident surface into which the light generated from the lamp is incident, a light reflecting surface extended from a side of the light incident surface, and a light exiting surface extended from another side of the light incident surface to form an angle of less than about 90 degrees with respect to the light incident surface. The light reflecting surface has a prism pattern. The prism pattern has a plurality of prisms adjacent to one another. A height of each of the prisms between the light incident surface and a selected position of a corresponding prism increases as a distance from the light incident surface to the selected position increases. The selected position is spaced apart from the light incident surface by a predetermined distance. Each of the prisms has a recess on a ridge of a corresponding prism between the light incident surface and the selected position. The light exiting surface and the light reflecting surface face each other. The LCD panel displays images using light received from the light guiding plate.

Therefore, a bright line and a shadow line that may be formed adjacent to the sides of the light guiding plate decrease so that an image display quality of the LCD apparatus is improved.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

It should be understood that the exemplary embodiments of the present invention described below may be modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter, the present invention will be described in detail with reference to the accompanying drawings.

Figure 1:
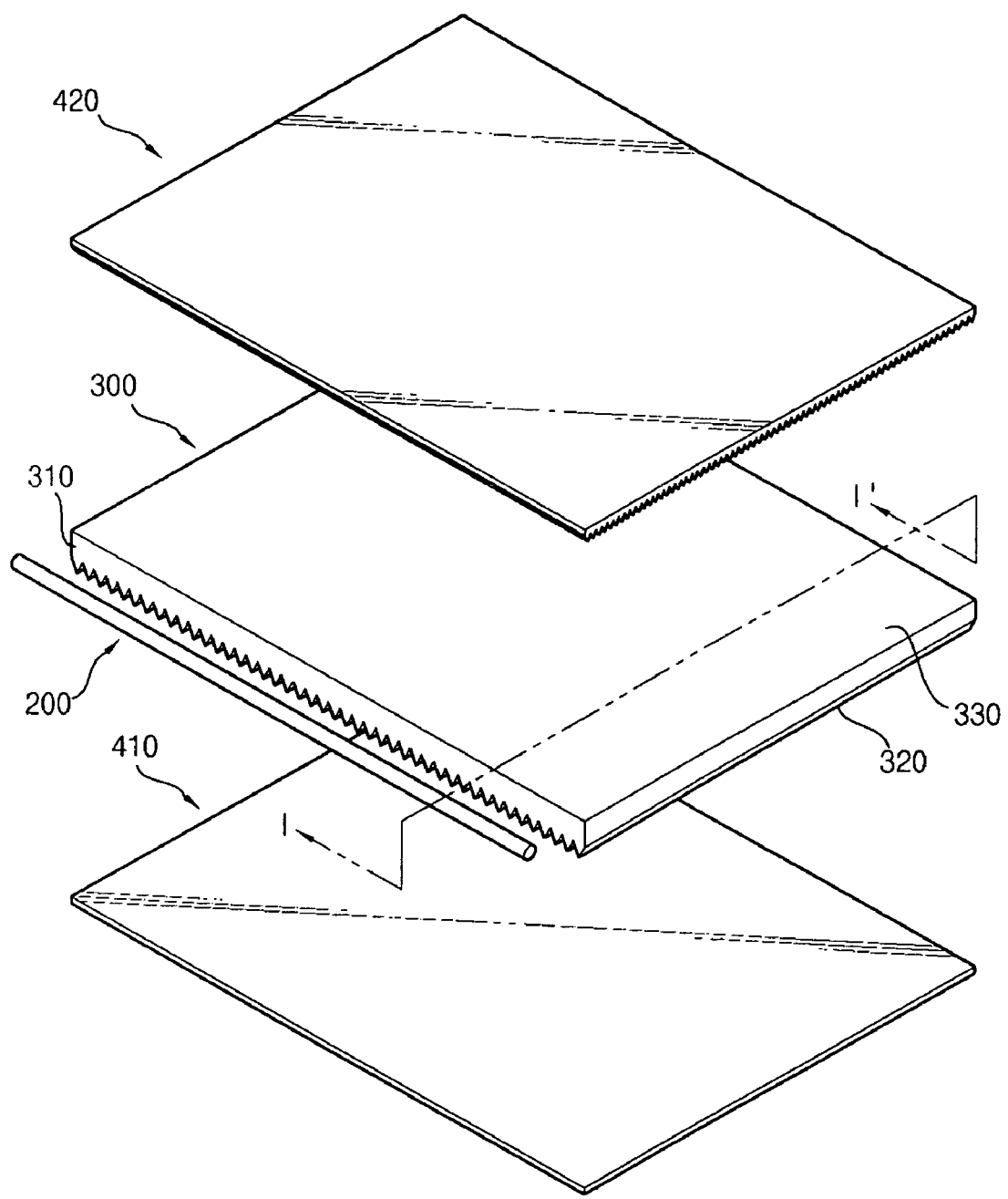
FIG. 1 is an exploded perspective view showing a backlight assembly in accordance with an exemplary embodiment of the present invention.
Figure 2:
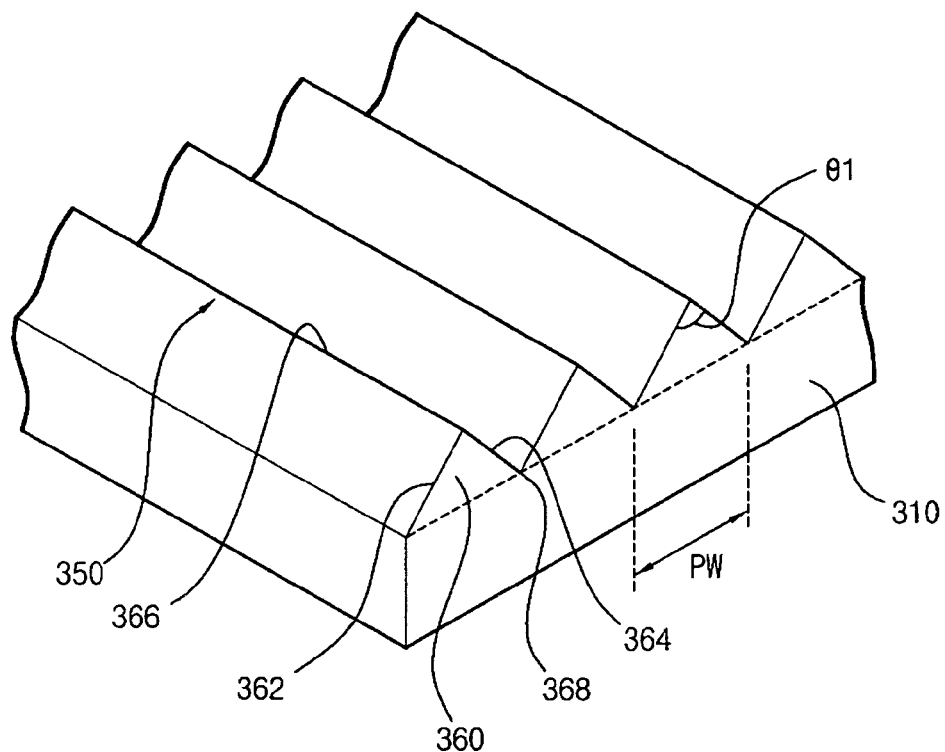
FIG. 2 is a perspective view showing a prism pattern shown in FIG. 1.
Figure 3:
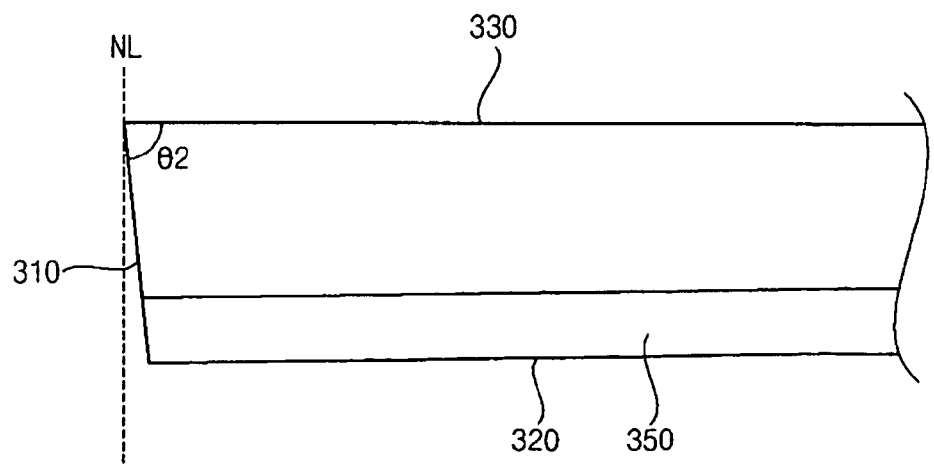
FIG. 3 is a cross-sectional view taken along line I-I' shown in FIG. 1.

FIG. 1 is an exploded perspective view showing a backlight assembly in accordance with an exemplary embodiment of the present invention. FIG. 2 is a perspective view showing a prism pattern for the light incident surface 310 of FIG. 1. FIG. 3 is a cross-sectional view of the light guiding plate 300 taken along line I-I' as shown in FIG. 1.

Referring to FIGS. 1 to 3, the backlight assembly 100 includes a lamp 200 generating light and a light guiding plate 300. The lamp 200 is adjacent to a side of the light guiding plate 300. The lamp 200 generates light based on a driving voltage that is provided from an inverter (not shown) to the lamp 200. In this exemplary embodiment, the lamp 200 includes a cold cathode fluorescent lamp (CCFL) that has a long cylindrical shape. Alternatively, a plurality of lamps may be employed and disposed adjacent to opposing sides of the light guiding plate 300.

The light guiding plate 300 guides the light generated from the lamp 200 in a predetermined direction. The light guiding plate 300 includes a light incident surface 310, a light reflecting surface 320 and a light exiting surface 330. The light generated from the lamp 200 is incident into the light incident surface 310. The light reflecting surface 320 is extended from a side of the light incident surface 310. The light exiting surface 330 is extended from another side of the light incident surface 310. A prism pattern 350 is formed on the reflecting surface 320 of the light guiding plate 300 to guide the light that is incident into the light incident surface 310.

Referring to FIG. 2, the prism pattern 350 includes a plurality of prisms 360. Each of the prisms 360 has a triangular prism shape that is substantially perpendicular to the light incident surface 310. Each of the prisms 360 may be extended in a direction substantially perpendicular to a longitudinal direction of the lamp 200. In this exemplary embodiment, each of the prisms 360 includes a first surface 362 and a second surface 364 that are inclined with respect to the light reflecting surface 320. The first and second surfaces 362 and 364 form ridges 366 and grooves 368. Each of the prisms 360 may have a various shape. In this exemplary embodiment, an interior angle $\theta 1$ formed between the first and second surfaces 362 and 364 is about 105 degrees, and a pitch PW between the ridges 366 adjacent to each other or between bottom portions of the grooves 368 adjacent to each other is about 25 μm.

Referring to FIG. 3, the light incident surface 310 forms an angle with respect to a normal line NL of the light exiting surface 330 so as to decrease a bright line and a shadow line adjacent to the light incident surface 310. That is, an interior angle $\theta 2$ between the light incident surface 310 and the light exiting surface 330 is less than about 90 degrees. In this exemplary embodiment, the angle formed between the light incident surface 310 and the normal line of the light exiting surface 330 is about 0.5 degrees so that the interior angle $\theta 2$ between the light incident surface 310 and the light exiting surface 330 is about 89.5 degrees.

The light guiding plate 300 has, for example, a wedge shape. A thickness of the light guiding plate 300 gradually decreases as a distance from the light incident surface 310 increases. In this exemplary embodiment, a thickness of the light guiding plate 300 corresponding to the light incident surface 310 is about 2.7 mm, and a thickness of the light guiding plate 300 corresponding to an opposite surface to the light incident surface 310 is about 0.8 mm. Alternatively, the light guiding plate 300 may have a uniform thickness.

Referring again to FIG. 1, the backlight assembly 100 further includes a reflecting sheet 410 under the reflecting surface 320 of the light guiding plate 300. A light passing through the light reflecting surface 320 is reflected from the reflecting sheet 410 toward the light guiding plate 300. The reflecting sheet 410 has a reflective material of high light reflectivity. The reflecting sheet 410 may comprise polyethylene terephthalate (PET), polycarbonate (PC), etc.

The backlight assembly 100 further includes at least one optical sheet 420 on the light exiting surface 330 of the light guiding plate 300. The optical sheet(s) 420 control a path of the light exiting from the light exiting surface 330 to improve luminance of the backlight assembly 100. In this exemplary embodiment, the optical sheet(s) 420 include a reverse prism sheet. A prism pattern is formed on a lower surface of the reverse prism sheet, and the prism pattern faces the light exiting surface 330 of the light guiding plate 300. The prism pattern of the reverse prism sheet has prisms extended, for example, in a direction substantially perpendicular to those of the prism pattern 350 of the light guiding plate 300. Such configuration may decrease the number of prism sheets compared with conventional backlight assemblies, while improving the luminance of the backlight assembly 100. The optical sheet(s) 420 may further include a diffusion sheet (not shown). The diffusion sheet (not shown) is disposed on or under the reverse prism sheet to diffuse the light exiting from the light guiding plate 300 or the reverse prism sheet, thereby making uniform the luminance of the light generated from the backlight assembly 100. Alternatively, the backlight assembly 100 may include a plurality of additional sheets.

Figure 4:
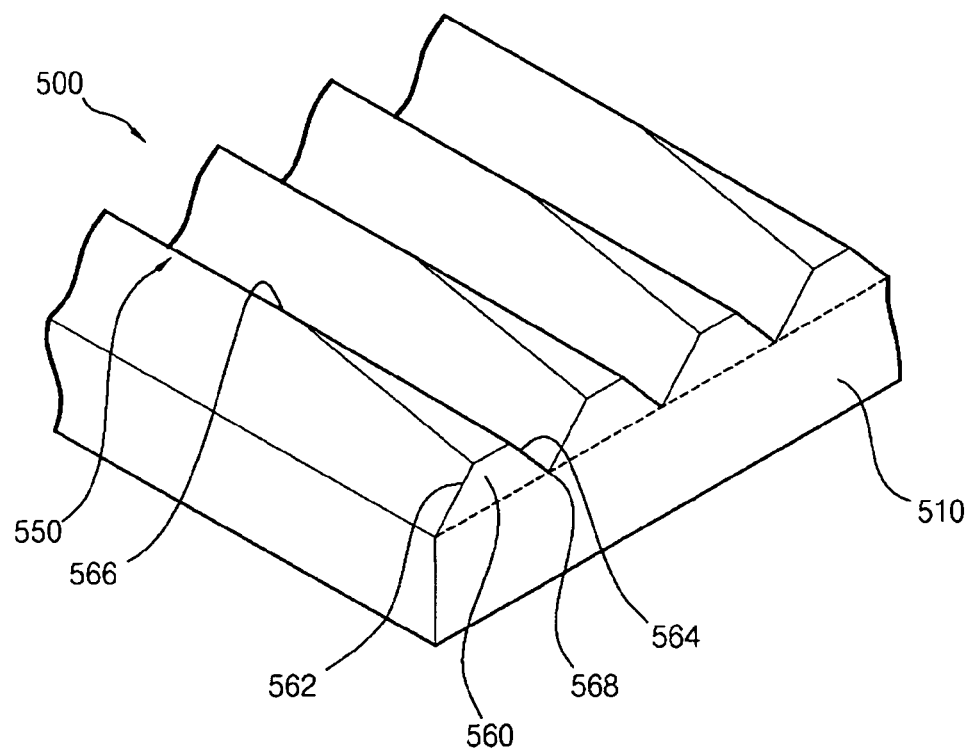
FIG. 4 is a perspective view showing a light guiding plate in accordance with another exemplary embodiment of the present invention.
Figure 5:
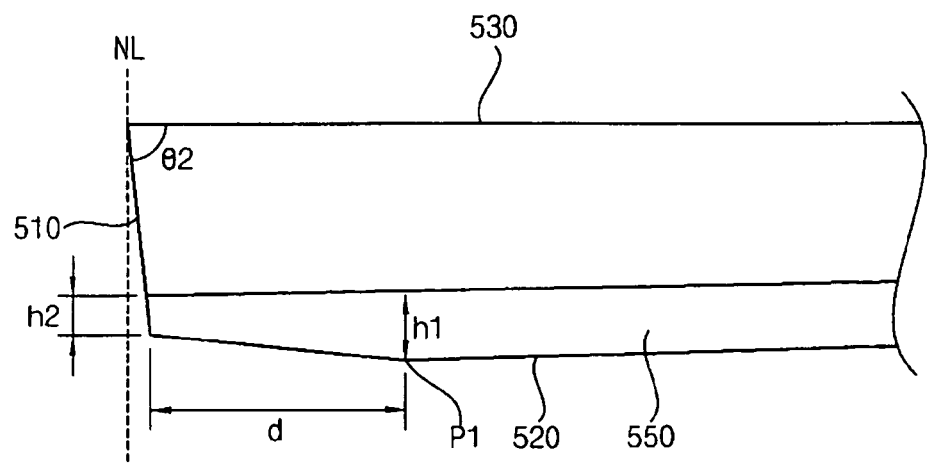
FIG. 5 is a cross-sectional view showing the light guiding plate shown in FIG. 4.

FIG. 4 is a perspective view showing a light guiding plate in accordance with another exemplary embodiment of the present invention. FIG. 5 is a cross-sectional view showing the light guiding plate shown in FIG. 4. The light guiding plate of FIGS. 4 and 5 is substantially similar to the light guiding plate 300 as shown and described in FIGS. 1 to 3 with the exception of the prism pattern. Thus, the same reference numerals will be used to refer to the same or like parts as those described in FIGS. 1 to 3 and any further explanation concerning the above elements will be omitted.

Referring to FIGS. 4 and 5, the light guiding plate 500 includes a light incident surface 510, a light reflecting surface 520 and a light exiting surface 530. A light generated from a lamp is incident into the light incident surface 510. The light reflecting surface 520 is extended from a side of the light incident surface 510. The light exiting surface 530 is extended from another side of the light incident surface 510. The light reflecting surface 520 and the light exiting surface 530 face each other.

The light incident surface 510 forms an angle with respect to a normal line (NL) of the light exiting surface 530. That is, an interior angle θ2 between the light incident surface 510 and the light exiting surface 530 is less than about 90 degrees. In this exemplary embodiment, the angle formed between the light incident surface 510 and the normal line of the light exiting surface 530 is about 0.5 degrees so that the interior angle θ2 between the light incident surface 510 and the light exiting surface 530 is about 89.5 degrees.

A prism pattern 550 is formed on the light reflecting surface 520 to control a path of the light incident into the light incident surface 510. The prism pattern 550 includes a plurality of prisms 560. Each of the prisms 560 has a triangular prism shape that is substantially perpendicular to the light incident surface 510. In this exemplary embodiment, each of the prisms 560 includes a first surface 562 and a second surface 564 that are inclined with respect to the light reflecting surface 520. The first and second surfaces 562 and 564 form ridges 566 and grooves 568. Each of the prisms 560 may have a various shape. In this exemplary embodiment, an interior angle formed between the first and second surfaces 562 and 564 is about 105 degrees, and a pitch between ridges adjacent to each other or between bottom portions of the grooves adjacent to each other is about 25 μm.

In this exemplary embodiment, a height of each of the prisms 560 increases as a distance from the light incident surface 510 increases. In other words, each of the prisms has a height varying such that a height at a position farther from the light incident surface 510 is larger than a height at a position closer to the light incident surface. In particular, the height of each of the prisms 560 increases in a distance between the light incident surface 510 and a first point P1. The height is a vertical height of each of the prisms 560 with respect to a bottom of each of the prisms 560. In this exemplary embodiment, the height of each of the prisms 560 linearly increases as the distance from the light incident surface 510 increases. For example, a first height h1 of each of the prisms 560 at the first point P1 is about 9 μm, and a second height h2 of each of the prisms 560 at the light incident surface 510 is about 5 μm. The distance between the light incident surface 510 and the first point P1 is about 20 mm to about 60 mm. In this exemplary embodiment, the distance between the light incident surface 510 and the first point P1 is about 40 mm. Alternatively, the height of each of the prisms 560 may increase in a curved line as the distance from the light incident surface 510 increases.

When the height of each of the prisms 560 adjacent to the light incident surface 510 decreases, an area for reflection and refraction also decreases to prevent a bright line and/or shadow from forming. In this embodiment, the prisms 560 each have a uniform height at a remaining region other than the region between the light incident surface 510 and the first point P1.

The light guiding plate 500 has, for example, a wedge shape. A thickness of the light guiding plate 500 gradually decreases as a distance from the light incident surface 510 increases. Alternatively, the light guiding plate 500 may have a uniform thickness.

Figure 6:
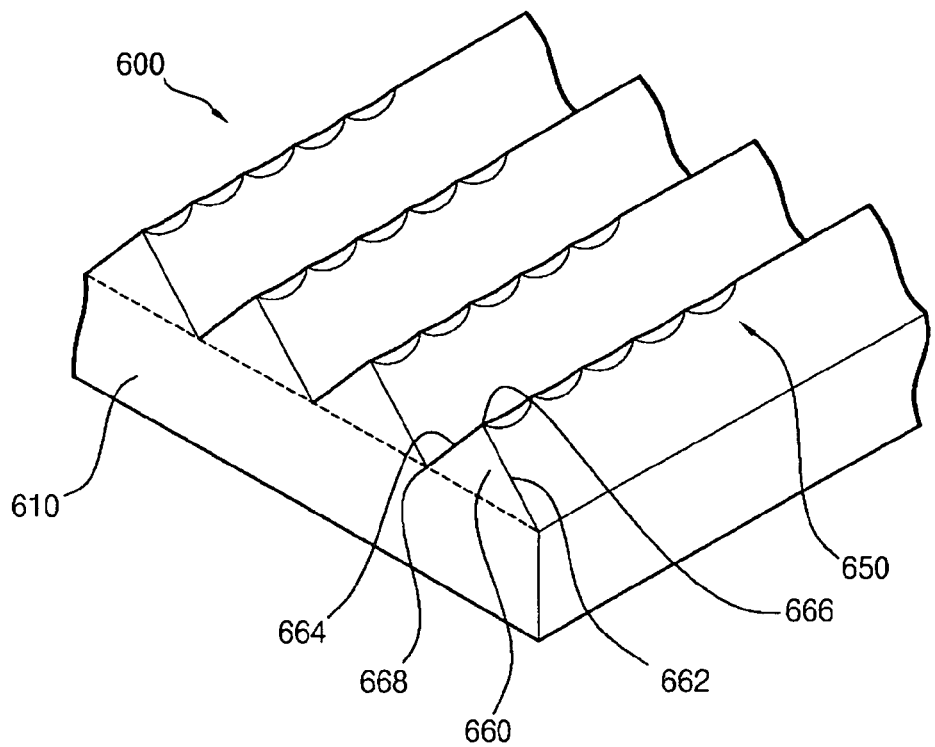
FIG. 6 is a perspective view showing a light guiding plate in accordance with another exemplary embodiment of the present invention.
Figure 7:
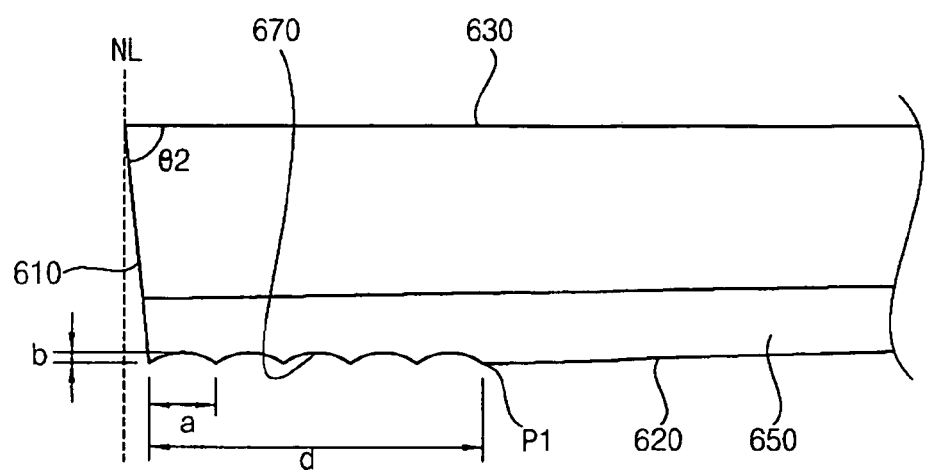
FIG. 7 is a cross-sectional view showing the light guiding plate shown in FIG. 6.

FIG. 6 is a perspective view showing a light guiding plate 600 in accordance with another exemplary embodiment of the present invention. FIG. 7 is a cross-sectional view of the light guiding plate 600 shown in FIG. 6. The light guiding plate 600 of FIGS. 6 and 7 is substantially similar to the light guiding plate 300 shown and described in FIGS. 1 to 3 with the exception of the prism pattern. Thus, the same reference numerals will be used to refer to the same or like parts as those described in FIGS. 1 to 3 and any further explanation concerning the above elements will be omitted.

Referring to FIGS. 6 and 7, the light guiding plate 600 includes a light incident surface 610, a light reflecting surface 620 and a light exiting surface 630. A light generated from a lamp is incident into the light incident surface 610. The light reflecting surface 620 is extended from a side of the light incident surface 610. The light exiting surface 630 is extended from another side of the light incident surface 610. The light reflecting surface 620 and the light exiting surface 630 face each other.

The light incident surface 610 forms an angle with respect to a normal line (NL) of the light exiting surface 630. That is, an interior angle θ2 between the light incident surface 610 and the light exiting surface 630 is less than about 90 degrees. In this exemplary embodiment, the angle formed between the light incident surface 610 and the normal line of the light exiting surface 630 is about 0.5 degrees so that the interior angle between the light incident surface 610 and the light exiting surface 630 is about 89.5 degrees.

A prism pattern 650 is formed on the light reflecting surface 620 to control a path of the light incident into the light incident surface 610. The prism pattern 650 includes a plurality of prisms 660. Each of the prisms 660 has a triangular prism shape that is substantially perpendicular to the light incident surface 610. In this exemplary embodiment, each of the prisms 660 includes a first surface 662 and a second surface 664 that are inclined with respect to the light reflecting surface 620. The first and second surfaces 662 and 664 form ridges 666 and grooves 668. Each of the prisms 660 may have a various shape. In this exemplary embodiment, an interior angle formed between the first and second surfaces 662 and 664 is about 105 degrees, and a pitch between ridges 666 adjacent to each other or between lower portions 668 of the grooves adjacent to each other is about 25 µm.

In this exemplary embodiment, a plurality of recesses 670 is formed on each of the ridges 666 of the prisms 660. The recesses 670 are formed between the light incident surface 610 and a first point P1. A distance 'd' between the light incident surface 610 and the first point P1 is about 20 mm to about 60 mm. In this exemplary embodiment, the distance between the light incident surface 610 and the first point P1 is about 40 mm. Each of the recesses 670 may have a various shape. In this exemplary embodiment, each of the recesses 670 has an arch shape. For example, a length 'a' of each of the recesses 670 is about 135 µm, and a depth 'b' of each of the recesses 670 is about 1.5 µm.

Each of the prisms 660 adjacent to the light incident surface 610 includes the recesses 670 to prevent a bright line and/or a shadow from forming.

The light guiding plate 600 has, for example, a wedge shape. A thickness of the light guiding plate 600 gradually decreases as a distance from the light incident surface 610 increases. Alternatively, the light guiding plate 600 may have a uniform thickness.

Figure 8:
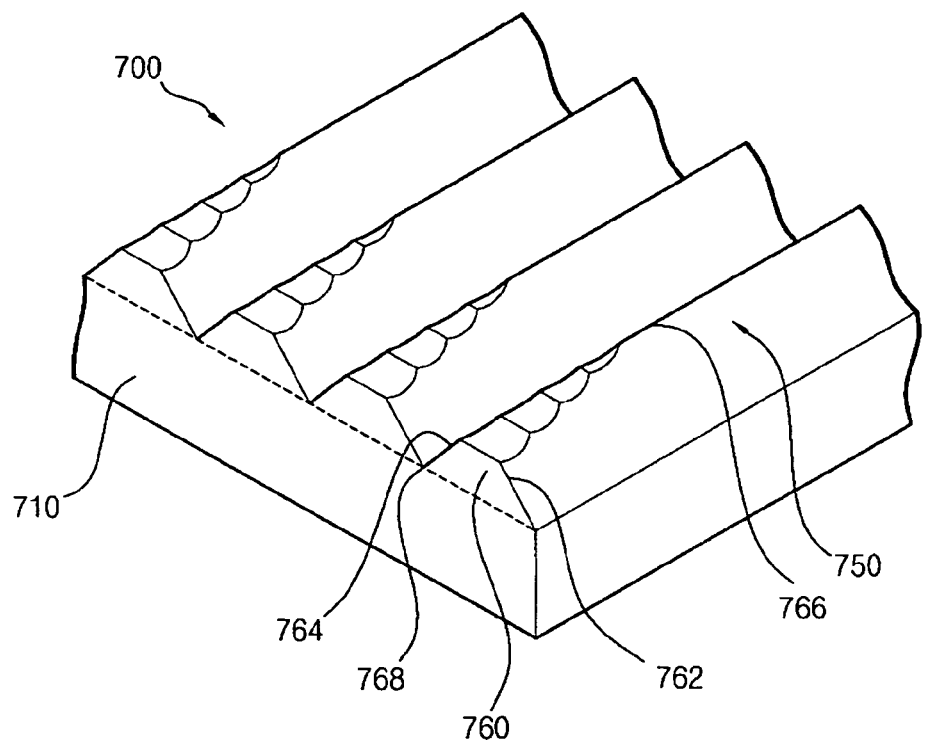
FIG. 8 is a perspective view showing a light guiding plate in accordance with another exemplary embodiment of the present invention.
Figure 9:
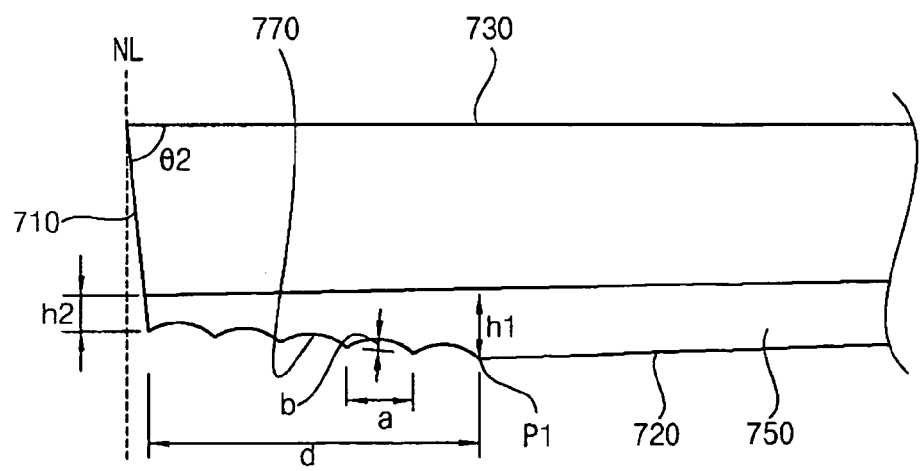
FIG. 9 is a cross-sectional view showing the light guiding plate shown in FIG. 8.

FIG. 8 is a perspective view showing a light guiding plate 700 in accordance with another exemplary embodiment of the present invention. FIG. 9 is a cross-sectional view of the light guiding plate 700 shown in FIG. 8. The light guiding plate 700 of FIGS. 8 and 9 is substantially similar to the light guiding plate shown in FIGS. 1 to 3 with the exception of the prism pattern. Thus, the same reference numerals will be used to refer to the same or like parts as those described in FIGS. 1 to 3 and any further explanation concerning the above elements will be omitted.

Referring to FIGS. 8 and 9, the light guiding plate 700 includes a light incident surface 710, a light reflecting surface 720 and a light exiting surface 730. A light generated from a lamp is incident into the light incident surface 710. The light reflecting surface 720 is extended from a side of the light incident surface 710. The light exiting surface 730 is extended from another side of the light incident surface 710, and corresponds to the light reflecting surface 720.

The light incident surface 710 forms an angle with respect to a normal line (NL) of the light exiting surface 730. That is, an interior angle θ2 between the light incident surface 710 and the light exiting surface 730 is less than about 90 degrees. In this exemplary embodiment, the angle formed between the light incident surface 710 and the normal line (NL) of the light exiting surface 730 is about 0.5 degrees so that the interior angle between the light incident surface 710 and the light exiting surface 730 is about 89.5 degrees.

A prism pattern 750 is formed on the light reflecting surface 720 to control a path of the light incident into the light incident surface 710. The prism pattern 750 includes a plurality of prisms 760. Each of the prisms 760 has a triangular prism shape that is substantially perpendicular to the light incident surface 710. In this exemplary embodiment, each of the prisms 760 includes a first surface 762 and a second surface 764 that are inclined with respect to the light reflecting surface 720. The first and second surfaces 762 and 764 form ridges 766 and grooves 768. Each of the prisms 760 may have a various shape. In this exemplary embodiment, an interior angle formed between the first and second surfaces 762 and 764 is about 105 degrees, and a pitch between ridges 766 adjacent to each other or between lower portions 768 of the grooves adjacent to each other is about 25 µm.

In this exemplary embodiment, a height of each of the prisms 760 increases as a distance from the light incident surface 710 increases. In particular, the height of each of the prisms 760 increases in a distance between the light incident surface 710 and a first point P1. The height is a vertical height of each of the prisms 760 with respect to a bottom of each of the prisms 760. In this exemplary embodiment, the height of each of the prisms 760 linearly increases as the distance from the light incident surface 710 increases. For example, a first height h1 of each of the prisms 760 at the first point P1 is about 9 µm, and a second height h2 of each of the prisms 760 at the light incident surface 510 is about 5 µm. The distance 'd' between the light incident surface 710 and the first point P1 is about 20 mm to about 60 mm. In this exemplary embodiment, the distance 'd' between the light incident surface 710 and the first point P1 is about 40 mm. Alternatively, the height of each of the prisms 760 may increase in a curved line as the distance from the light incident surface 710 increases.

In this exemplary embodiment, a plurality of recesses 770 is formed on each of the ridges 766 of the prisms 760. The recesses 770 are formed between the light incident surface 710 and the first point P1. Each of the recesses 770 may have a various shape for reflecting and diffusing the light. In this exemplary embodiment, each of the recesses 770 has an arch shape. For example, a length 'a' of each of the recesses 770 is about 135 µm, and a depth 'b' of each of the recesses 770 is about 1.5 µm. The length 'a' of each of the recesses 770 may decrease as the distance from the light incident surface 710 increases.

According to this exemplary embodiment, the height of each of the prisms 760 adjacent to the light incident surface 710 decreases, and each of the prisms 760 adjacent to the light incident surface 710 includes the recesses 770 to prevent a bright line and/or a shadow from forming.

The light guiding plate 700 has, for example, a wedge shape. A thickness of the light guiding plate 700 gradually decreases as a distance from the light incident surface 710 increases. Alternatively, the light guiding plate 700 may have a uniform thickness.

Figure 10:
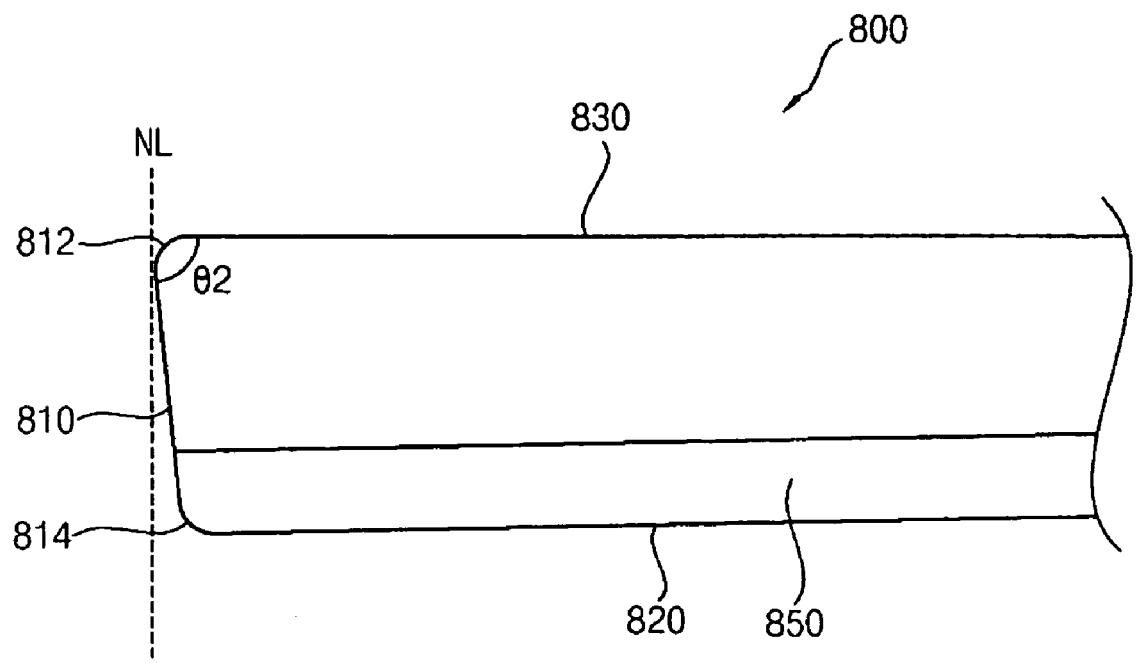
FIG. 10 is a cross-sectional view showing a light guiding plate in accordance with another exemplary embodiment of the present invention.

FIG. 10 is a cross-sectional view showing a light guiding plate 800 in accordance with another exemplary embodiment of the present invention. The light guiding plate 800 of FIG. 10 is substantially similar to the light guiding plate 300 shown in FIGS. 1 to 3. Thus, the same reference numerals will be used to refer to the same or like parts as those described in FIGS. 1 to 3 and any further explanation concerning the above elements will be omitted.

Referring to FIG. 10, the light guiding plate 800 includes a light incident surface 810, a light reflecting surface 820 and a light exiting surface 830. A light generated from a lamp is incident into the light incident surface 810. The light reflecting surface 820 is extended from a side of the light incident surface 810. The light exiting surface 830 is extended from another side of the light incident surface 810. The light reflecting surface 820 and the light exiting surface 830 face each other.

The light incident surface 810 forms an angle with respect to a normal line (NL) of the light exiting surface 830. That is, an interior angle θ2 between the light incident surface 810 and the light exiting surface 830 is less than about 90 degrees. In this exemplary embodiment, the angle formed between the light incident surface 810 and the normal line (NL) of the light exiting surface 830 is about 0.5 degrees so that the interior angle between the light incident surface 810 and the light exiting surface 830 is about 89.5 degrees.

A prism pattern 850 is formed on the light reflecting surface 820 to control a path of the light incident into the light incident surface 810. The prism pattern 850 includes a plurality of prisms 860. Each of the prisms 860 has a triangular prism shape that is substantially perpendicular to the light incident surface 810. Each of the prisms 860 may have various shapes. For example, a height of each of the prisms 860 may increase adjacent to the light incident surface 810 as a distance from the light incident surface 810 increases. A plurality of recesses (not shown) may be formed on each of the prisms 860 adjacent to the light incident surface 810.

In this exemplary embodiment, a first corner 812 between the light incident surface 810 and the light exiting surface 830 has a rounded shape. In addition, a second corner 814 between the light incident surface 810 and the light reflecting surface 820 also has a rounded shape. When the first and second corners 812 and 814 of the light guiding plate 800 have the rounded shape, the light generated from a lamp (not shown) may not concentrated on the first corner 812 or the second corner 814, thereby preventing a bright line and/or a shadow from forming adjacent to the light incident surface 810. Alternatively, the first and second corners 812 and 814 may be chamfered.

The light guiding plate 800 has, for example, a wedge shape. A thickness of the light guiding plate 800 gradually decreases as a distance from the light incident surface 810 increases. Alternatively, the light guiding plate 800 may have a uniform thickness.

Figure 11:
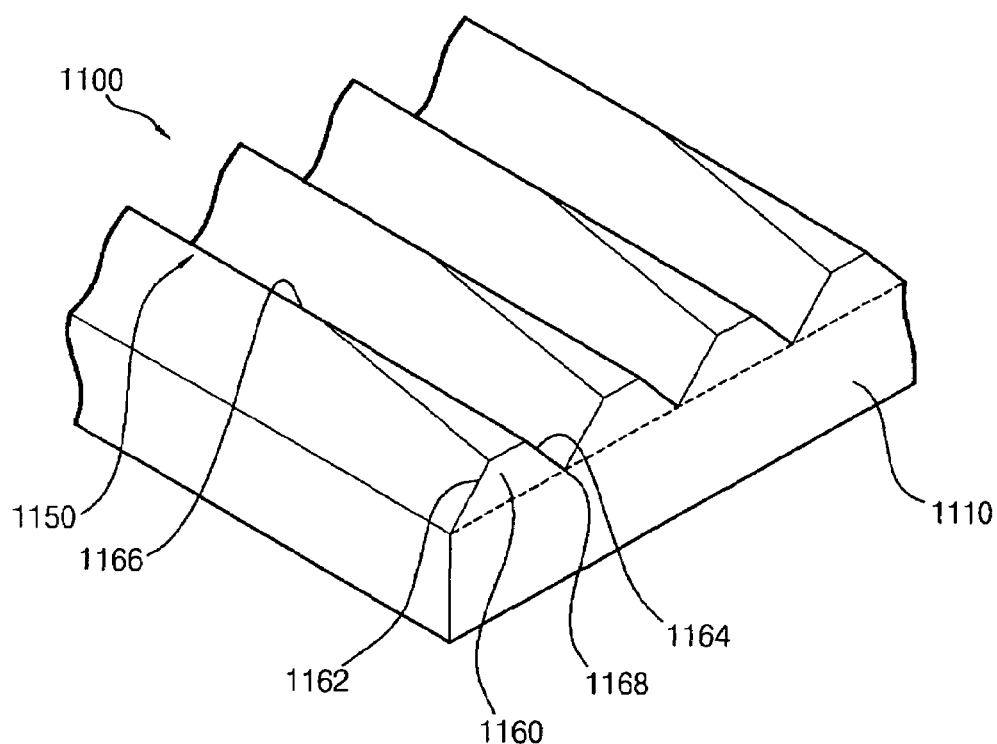
FIG. 11 is a perspective view showing a light guiding plate in accordance with another exemplary embodiment of the present invention.
Figure 12:
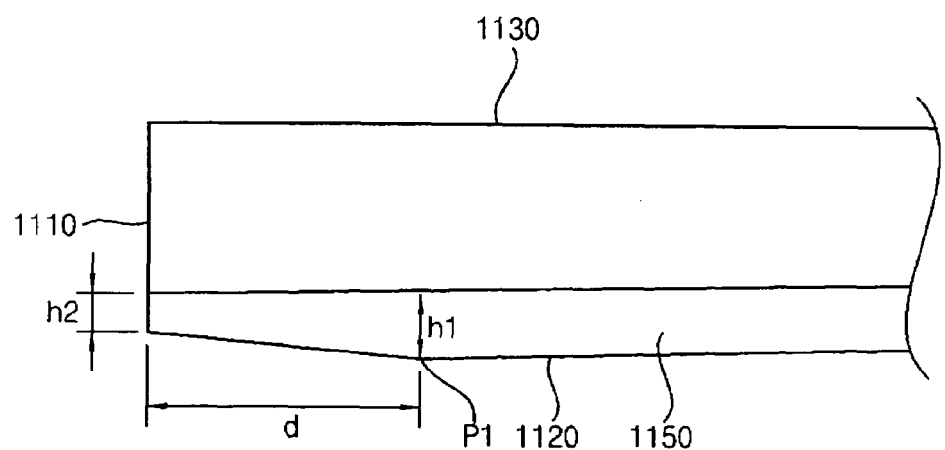
FIG. 12 is a cross-sectional view showing the light guiding plate shown in FIG. 11.

FIG. 11 is a perspective view showing a light guiding plate 1100 in accordance with another exemplary embodiment of the present invention. FIG. 12 is a cross-sectional view showing the light guiding plate 1100 shown in FIG. 11. The light guiding plate 1100 of FIGS. 11 and 12 is substantially similar to the light guiding plate 300 shown in FIGS. 1 to 3 with the exception of the prism pattern. Thus, the same reference numerals will be used to refer to the same or like parts as those described in FIGS. 1 to 3 and any further explanation concerning the above elements will be omitted.

Referring to FIGS. 11 and 12, the light guiding plate 1100 includes a light incident surface 1110, a light reflecting surface 1120 and a light exiting surface 1130. A light generated from a lamp is incident into the light incident surface 1110. The light reflecting surface 1120 is extended from a side of the light incident surface 1110. The light exiting surface 1130 is extended from another side of the light incident surface 1110. The light reflecting surface 1120 and the light exiting surface 1130 face each other. The light incident surface 1110 is substantially perpendicular to the light exiting surface 1130.

A prism pattern 1150 is formed on the light reflecting surface 1120 to control a path of the light incident into the light incident surface 1110. The prism pattern 1150 includes a plurality of prisms 1160. Each of the prisms 1160 has a triangular prism shape that is substantially perpendicular to the light incident surface 1110. In this exemplary embodiment, each of the prisms 1160 includes a first surface 1162 and a second surface 1164 that are inclined with respect to the light reflecting surface 1120. The first and second surfaces 1162 and 1164 form ridges 1166 and grooves 1168. Each of the prisms 1160 may have a various shape. In this exemplary embodiment, an interior angle formed between the first and second surfaces 1162 and 1164 is about 120 degrees, and a pitch between ridges 1166 adjacent to each other or between lower portions 1168 of the grooves adjacent to each other is about 50 μm to about 60 μm.

In this exemplary embodiment, a height of each of the prisms 1160 increases as a distance from the light incident surface 1110 increases. In particular, the height of each of the prisms 1160 increases in a distance between the light incident surface 1110 and a first point P1. The height is a vertical height of each of the prisms 1160 with respect to a bottom of each of the prisms 1160. In this exemplary embodiment, the height of each of the prisms 1160 linearly increases as the distance from the light incident surface 1110 increases. Alternatively, a height of the bottom of each of the prisms 1160 adjacent to the light incident surface 1110 may increase with respect to the light exiting surface 1130 so that the height of each of the prisms 1160 may be changed. For example, a first height h1 of each of the prisms 1160 at the first point P1 is about 25 μm, and a second height h2 of each of the prisms 1160 at the light incident surface 1110 is about 9 μm. A distance 'd' between the light incident surface 1110 and the first point P1 is about 2 mm to about 6 mm. Alternatively, the height of each of the prisms 1160 may increase in a curved line as the distance from the light incident surface 1110 increases.

The light guiding plate 1100 has, for example, a wedge shape. A thickness of the light guiding plate 1100 gradually decreases as a distance from the light incident surface 1110 increases. Alternatively, the light guiding plate 1100 may have a uniform thickness.

Figure 13:
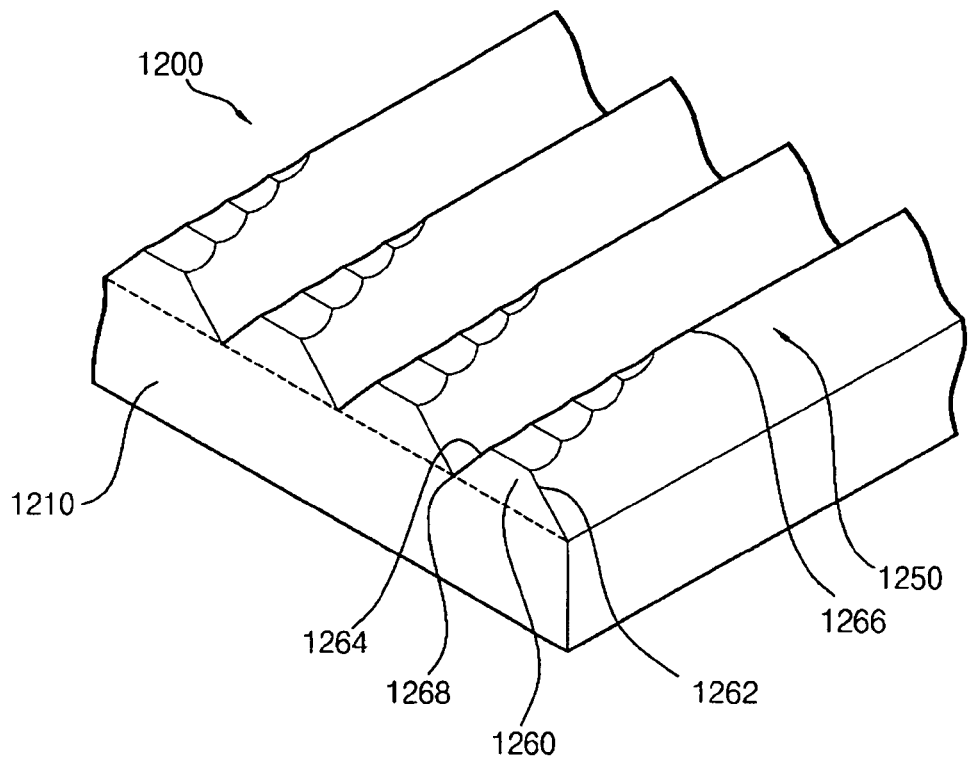
FIG. 13 is a perspective view showing a light guiding plate in accordance with another exemplary embodiment of the present invention.
Figure 14:
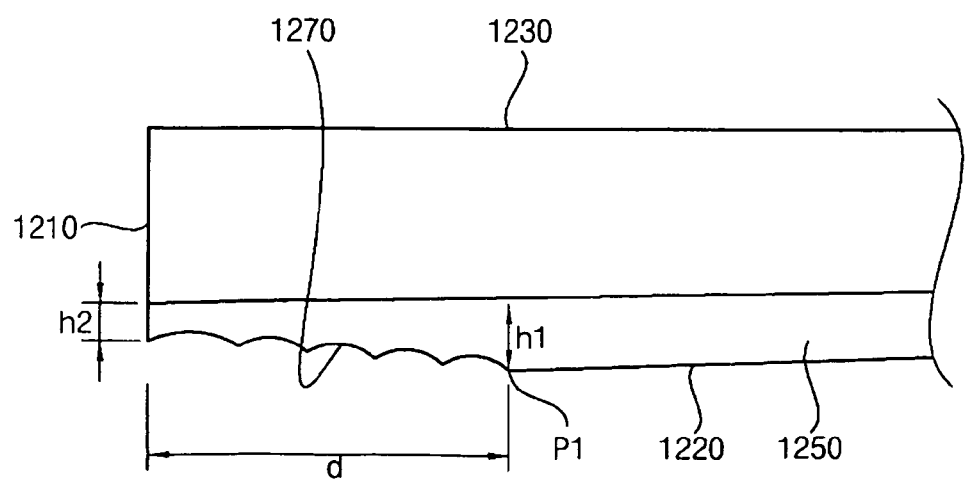
FIG. 14 is a cross-sectional view showing the light guiding plate shown in FIG. 13.

FIG. 13 is a perspective view showing a light guiding plate 1200 in accordance with another exemplary embodiment of the present invention. FIG. 14 is a cross-sectional view showing the light guiding plate 1200 of FIG. 13. The light guiding plate 1200 of FIGS. 13 and 14 is substantially similar to the light guiding plate 300 shown in FIGS. 1 to 3 with the exception of the prism pattern. Thus, the same reference numerals will be used to refer to the same or like parts as those described in FIGS. 1 to 3 and any further explanation concerning the above elements will be omitted.

Referring to FIGS. 13 and 14, the light guiding plate 1200 includes a light incident surface 1210, a light reflecting surface 1220 and a light exiting surface 1230. A light generated from a lamp is incident into the light incident surface 1210. The light reflecting surface 1220 is extended from a side of the light incident surface 1210. The light exiting surface 1230 is extended from another side of the light incident surface 1210. The light reflecting surface 1220 and the light exiting surface 1230 face each other. The light incident surface 1210 is substantially perpendicular to the light exiting surface 1230.

A prism pattern 1250 is formed on the light reflecting surface 1220 to control a path of the light incident into the light incident surface 1210. The prism pattern 1250 includes a plurality of prisms 1260. Each of the prisms 1260 has a triangular prism shape that is substantially perpendicular to the light incident surface 1210. In this exemplary embodiment, each of the prisms 1260 includes a first surface 1262 and a second surface 1264 that are inclined with respect to the light reflecting surface 1220. The first and second surfaces 1262 and 1264 form ridges 1266 and grooves 1268. Each of the prisms 1260 may have a various shape. In this exemplary embodiment, an interior angle formed between the first and second surfaces 1262 and 1264 is about 120 degrees, and a pitch between ridges 1266 adjacent to each other or between lower portions 1268 of the grooves adjacent to each other is about 50 μm to about 60 μm.

In this exemplary embodiment, a height of each of the prisms 1260 increases as a distance from the light incident surface 1210 increases. In particular, the height of each of the prisms 1260 increases in a distance 'd' between the light incident surface 1210 and a first point P1. The height is a vertical height of each of the prisms 1260 with respect to a bottom of each of the prisms 1260. In this exemplary embodiment, the height of each of the prisms 1260 linearly increases as the distance from the light incident surface 1210 increases. For example, a first height h1 of each of the prisms 1260 at the first point P1 is about 25 μm, and a second height h2 of each of the prisms 1260 at the light incident surface 1210 is about 9 μm. The distance 'd' between the light incident surface 1210 and the first point P1 is about 2 mm to about 6 mm. Alternatively, the height of each of the prisms 1260 may increase in a curved line as the distance from the light incident surface 1210 increases.

In this exemplary embodiment, a plurality of recesses 1270 is formed on each of the prisms 1260. The recesses 1270 are formed between the light incident surface 1210 and the first point P1. Each of the recesses 1270 may have a various shape for reflecting and diffusing the light. In this exemplary embodiment, each of the recesses 1270 has an arch shape.

The light guiding plate 1200 has, for example, a wedge shape. A thickness of the light guiding plate 1200 gradually decreases as a distance from the light incident surface 1210 increases. Alternatively, the light guiding plate 1200 may have a uniform thickness.

Figure 15:
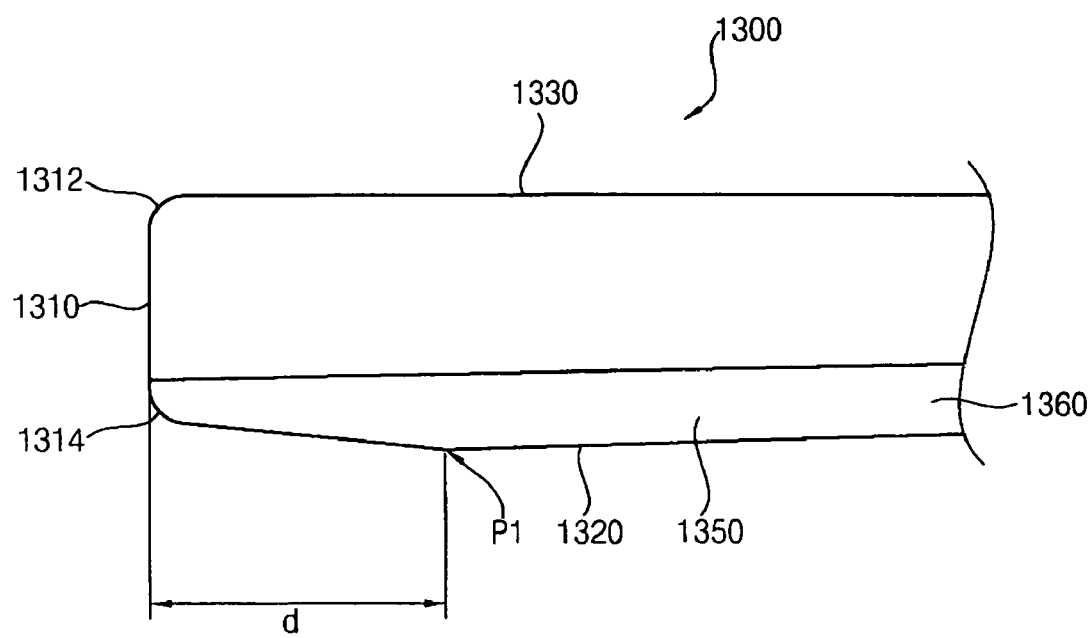
FIG. 15 is a cross-sectional view showing a light guiding plate in accordance with another exemplary embodiment of the present invention.

FIG. 15 is a cross-sectional view showing a light guiding plate 1300 in accordance with another exemplary embodiment of the present invention. The light guiding plate 1300 of FIG. 15 is substantially similar to the light guiding plate shown in FIGS. 11 and 12. Thus, the same reference numerals will be used to refer to the same or like parts as those described in FIGS. 11 and 12, and any further explanation concerning the above elements will be omitted.

Referring to FIG. 15, the light guiding plate 1300 includes a light incident surface 1310, a light reflecting surface 1320 and a light exiting surface 1330. A light generated from a lamp (not shown) is incident into the light incident surface 1310. The light reflecting surface 1320 is extended from a side of the light incident surface 1310. The light exiting surface 1330 is extended from another side of the light incident surface 1310. The light reflecting surface 1320 and the light exiting surface 1330 face each other. The light incident surface 1310 is substantially perpendicular to the light exiting surface 1330.

A prism pattern 1350 is formed on the light reflecting surface 1320 to control a path of the light incident into the light incident surface 1310. The prism pattern 1350 includes a plurality of prisms 1360. Each of the prisms 1360 has a triangular prism shape that is substantially perpendicular to the light incident surface 1310. In this exemplary embodiment, a height of each of the prisms 1360 increases as a distance from the light incident surface 1310 increases. In particular, the height of each of the prisms 1360 increases in a distance 'd' between the light incident surface 1310 and a first point P1. Alternatively, a plurality of recesses (not shown) is formed on each of the prisms 1360 between the light incident surface 1310 and the first point P1.

In this exemplary embodiment, a first corner 1312 between the light incident surface 1310 and the light exiting surface 1330 has a rounded shape. In addition, a second corner 1314 between the light incident surface 1310 and the light reflecting surface 1320 also has a rounded shape. When the first and second corners 1312 and 1314 of the light guiding plate 1300 have the rounded shape, a light generated from a lamp (not shown) may not concentrated on the first corner 1312 or the second corner 1314, thereby preventing a bright line and/or shadow from forming adjacent to the light incident surface 1310.

The light guiding plate 1300 has, for example, a wedge shape. A thickness of the light guiding plate 1300 gradually decreases as a distance from the light incident surface 1310 increases. Alternatively, the light guiding plate 1300 may have a uniform thickness.

Figure 16:
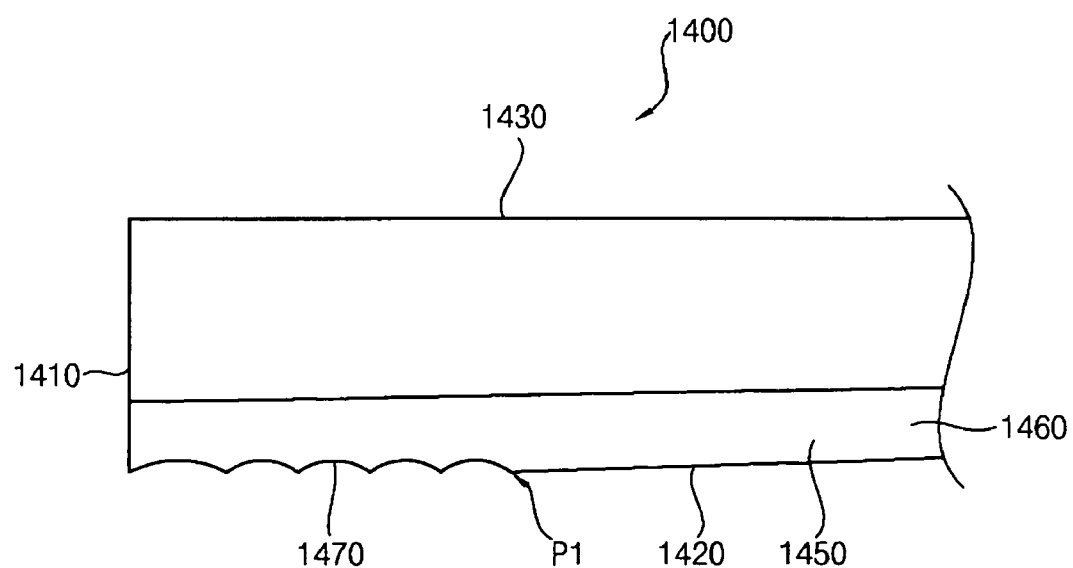
FIG. 16 is a cross-sectional view showing a light guiding plate in accordance with another exemplary embodiment of the present invention.

FIG. 16 is a cross-sectional view of a light guiding plate 1400 in accordance with another exemplary embodiment of the present invention. The light guiding plate 1400 of FIG. 16 is substantially similar to the light guiding plate 1200 shown in FIGS. 13 and 14 with the exception of the prism pattern. Thus, the same reference numerals will be used to refer to the same or like parts as those described in FIGS. 13 and 14 and any further explanation concerning the above elements will be omitted.

Referring to FIG. 16, the light guiding plate 1400 includes a light incident surface 1410, a light reflecting surface 1420 and a light exiting surface 1430. A light generated from a lamp is incident into the light incident surface 1410. The light reflecting surface 1420 is extended from a side of the light incident surface 1410. The light exiting surface 1430 is extended from another side of the light incident surface 1410. The light reflecting surface 1420 and the light exiting surface 1430 face each other. The light incident surface 1410 is substantially perpendicular to the light exiting surface 1430.

A prism pattern 1450 is formed on the light reflecting surface 1420 to control a path of the light incident into the light incident surface 1410. The prism pattern 1450 includes a plurality of prisms 1460. Each of the prisms 1460 has a triangular prism shape that is substantially perpendicular to the light incident surface 1410.

A plurality of recesses 1470 is formed on each of the prisms 1460. The recesses 1470 are formed between the light incident surface 1410 and a first point P1. Each of the recesses 1470 may have a various shape. In this exemplary embodiment, each of the recesses 1470 has an arch shape.

The light guiding plate 1400 has a wedge shape. A thickness of the light guiding plate 1400 gradually decreases as a distance from the light incident surface 1410 increases. Alternatively, the light guiding plate 1400 may have a uniform thickness.

Figure 17:
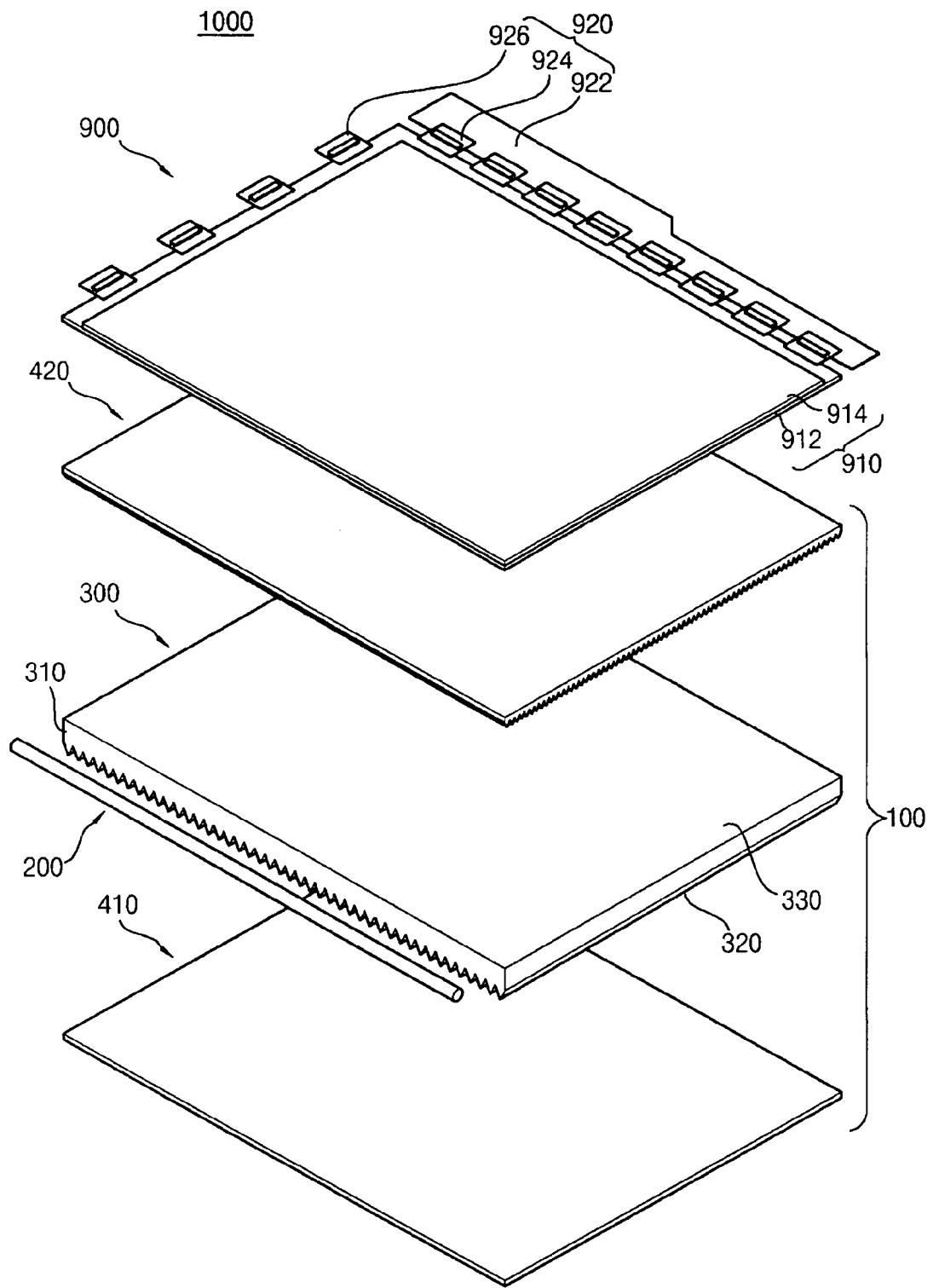
FIG. 17 is an exploded perspective view showing a liquid crystal display apparatus in accordance with an exemplary embodiment of the present invention.

FIG. 17 is an exploded perspective view showing an LCD apparatus 1000 in accordance with an exemplary embodiment of the present invention. In this embodiment, the LCD apparatus 1000 employs the light guiding plate in FIGS. 1-3. It should be noted, however, that the LCD apparatus of the present invention may employ any one of the embodiments shown in FIGS. 1-16 as a light guiding plate therein. Since the embodiments of the light guiding plate are described above in detail, no further description of the light guiding plate of the LCD apparatus is provided below.

Referring to FIG. 17, the LCD apparatus 1000 includes a backlight assembly 100 and a display unit 900.

The display unit 900 includes an LCD panel 910 and a driving circuit 920. The LCD panel 910 displays images using light generated from the backlight assembly 100. The driving circuit 920 outputs driving signals to the LCD panel 910 to drive the LCD panel 910.

The LCD panel 910 includes a first substrate 912, a second substrate 914 and a liquid crystal layer (not shown). The second substrate 914 is combined with the first substrate 912. The liquid crystal layer (not shown) is disposed between the first and second substrates 912 and 914, respectively.

The first substrate 912 has a plurality of switching elements arranged in a matrix shape. In this exemplary embodiment, each of the switching elements is a thin film transistor (TFT). The first substrate 912 may be a glass substrate. A data line and a gate line are electrically connected to a source electrode and a gate electrode of each of the TFTs. A drain electrode of each of the TFTs is electrically connected to a pixel electrode having a transparent conductive material.

The second substrate 914 includes a red color filter, a green color filter and a blue color filter as a thin film. In this exemplary embodiment, the second substrate 914 is a glass substrate. A common electrode having a transparent conductive material is formed on the second substrate 914.

When an electric power is applied to the gate electrode of each of the TFTs so that the TFT is turned on, an electric field is formed between the pixel electrode and the common electrode. Liquid crystal of the liquid crystal layer (not shown) varies in its molecular arrangement in response to the electric field applied thereto, and thus a light transmittance of the liquid crystal may be changed, thereby displaying images.

The driving circuit 920 includes a source printed circuit board (PCB) 922, a data flexible circuit film 924 and a gate flexible circuit film 926. The source PCB 922 applies a data driving signal and a gate driving signal to the LCD panel 910 to drive the LCD panel 910. The source PCB 922 is electrically coupled with the LCD panel 910 through the data flexible circuit film 924. The gate flexible circuit film 926 is electrically connected to the gate line of the LCD panel 910.

For example, the data flexible circuit film 924 and the gate flexible circuit film 926 are formed through a tape carrier package (TCP) process or a chip on film (COF) process. The data driving signal generated from the source PCB 920 is applied to the data line of the LCD panel 910 through the data flexible circuit film 924. In addition, the gate driving signal is applied to the gate line of the LCD panel 910 through the gate flexible circuit film 926. Alternatively, the LCD panel 910 may further include a signal line (not shown) between the data flexible circuit film 924 and the gate flexible circuit film 926 to transmit the gate driving signal.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly comprising:
a lamp that generates light; and
a light guiding plate including:
a light incident surface into which the light generated from the lamp is incident;
a light reflecting surface extended from a side of the light incident surface, the light reflecting surface having a prism pattern, the prism pattern comprising prisms; and
a light exiting surface extended from another side of the light incident surface,
wherein an angle formed between the light incident surface and the light exiting surface is smaller than about 90 degrees, and the light exiting surface and the light reflecting surface face each other;
wherein the prisms each have varying heights between the light incident surface and a selected position of a corresponding prism, the selected position being spaced a predetermined distance from the light incident surface;
wherein a length of the predetermined distance is smaller than a length of the corresponding prism, the prisms each having a uniform height at a remaining region other than a region of the predetermined distance.

2. The backlight assembly of claim 1, wherein the angle between the light incident surface and the light exiting surface is about 89.5 degrees.

3. The backlight assembly of claim 1, wherein each of the prisms is extended in a direction substantially perpendicular to the light incident surface.

4. The backlight assembly of claim 3, wherein the prisms each have a height varying such that a height at a position farther from the light incident surface is larger than a height at a position closer to the light incident surface.

5. The backlight assembly of claim 1, wherein a recess is formed on a ridge of each of the prisms between the light incident surface and the selected position.

6. The backlight assembly of claim 1, wherein the predetermined distance between the light incident surface and the selected position is about 20 mm to about 60 mm.

7. The backlight assembly of claim 1, wherein a recess is formed on a ridge of each of the prisms adjacent to the light incident surface.

8. The backlight assembly of claim 1, wherein a first corner between the light incident surface and the light exiting surface, and a second corner between the light incident surface and the light reflecting surface are rounded.

9. The backlight assembly of claim 1, wherein a thickness of the light guiding plate decreases as a distance from the light incident surface increases.

10. The backlight assembly of claim 1, further comprising:
a reflecting sheet located under the light reflecting surface; and
optical sheets placed on the light exiting surface.

11. The backlight assembly of claim 10, wherein each of the optical sheets comprises a reverse prism sheet.

12. A backlight assembly comprising:
a lamp that generates light; and
a light guiding plate including:
a light incident surface into which the light generated from the lamp is incident;
a light reflecting surface extended from a side of the light incident surface, the light reflecting surface including a prism pattern having a plurality of prisms adjacent to one another, wherein a height of each of the prisms between the light incident surface and a first point increases as a distance from the light incident surface to the first point increases, the first point being spaced a predetermined distance from the light incident surface, and wherein further each of the prisms includes a recess on a ridge thereof between the light incident surface and the first point; and
a light exiting surface extended from another side of the light incident surface, the light exiting surface and the light incident surface forming an angle smaller than about 90 degrees, the light exiting surface and the light reflecting surface face each other.

13. A backlight assembly comprising:
a lamp that generates light; and a light guiding plate including:
  a light incident surface into which the light generated from the lamp is incident;
  a light reflecting surface extended from a side of the light incident surface, the light reflecting surface including a prism pattern having a plurality of prisms adjacent to one another, wherein a height of each of the prisms between the light incident surface and a selected position increases as a distance from the light incident surface to the selected position increases; and
  a light exiting surface extended from another side of the light incident surface, the light exiting surface and the light reflecting surface face each other.

14. The backlight assembly of claim 13, wherein the selected position is spaced a predetermined distance from the light incident surface, the predetermined distance is shorter than a length of the respective prisms.

15. The backlight assembly of claim 13, wherein each of the prisms is extended in a direction substantially perpendicular to a longitudinal direction of the lamp.

16. The backlight assembly of claim 13, wherein a recess is formed on a ridge of each of the prisms between the light incident surface and the selected position.

17. The backlight assembly of claim 13, wherein a first corner between the light incident surface and the light exiting surface, and a second corner between the light incident surface and the light reflecting surface are rounded.

18. A backlight assembly comprising:
  a lamp that generates light; and
  a light guiding plate including:
    a light incident surface into which the light generated from the lamp is incident;
    a light reflecting surface extended from a side of the light incident surface, the light reflecting surface including a prism pattern including a plurality of prisms adjacent to one another, the plurality of prisms protruding outwardly from the light reflecting surface and extended longitudinally in a direction substantially perpendicular to the light incident surface, each of the prisms including a recess on a ridge of a corresponding prism adjacent to the light incident surface; and
    a light exiting surface extended from another side of the light incident surface, the light exiting surface and the light reflecting surface face each other.

19. A liquid crystal display apparatus comprising:
  a backlight assembly including:
    a lamp that generates light; and
    a light guiding plate including a light incident surface into which the light generated from the lamp is incident, a light reflecting surface extended from a side of the light incident surface, and a light exiting surface extended from another side of the light incident surface to form an angle of less than about 90 degrees with respect to the light incident surface, the light reflecting surface including a prism pattern having a plurality of prisms adjacent to one another, wherein a height of each of the prisms between the light incident surface and a selected position of a corresponding prism increases as a distance from the light incident surface to the selected position increases, the selected position being spaced a predetermined distance from the light incident surface, and wherein further each of the prisms includes a recess on a ridge of a corresponding prism between the light incident surface and the selected position, and the light exiting surface and the light reflecting surface face each other; and
  a liquid crystal display panel that displays an image using light received from the light guiding plate.

20. The liquid crystal display apparatus of claim 19, wherein the light incident surface and the light exiting surface form an angle smaller than about 90 degrees.

* * * * *